United States Patent
Tsukamoto

(10) Patent No.: US 12,097,774 B2
(45) Date of Patent: Sep. 24, 2024

(54) COOLING METHOD AND COOLING DEVICE OF ELECTRIC MOTOR

(71) Applicants: Nissan Motor Co., Ltd., Yokohama (JP); Renault S.A.S., Boulogne-Billancourt (FR)

(72) Inventor: Yukinori Tsukamoto, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 1038 days.

(21) Appl. No.: 16/979,902

(22) PCT Filed: Apr. 10, 2018

(86) PCT No.: PCT/IB2018/000553
§ 371 (c)(1),
(2) Date: Sep. 11, 2020

(87) PCT Pub. No.: WO2019/197858
PCT Pub. Date: Oct. 17, 2019

(65) Prior Publication Data
US 2021/0008982 A1    Jan. 14, 2021

(51) Int. Cl.
*B60L 3/00* (2019.01)
*B60W 10/30* (2006.01)
*H02K 9/19* (2006.01)

(52) U.S. Cl.
CPC .......... *B60L 3/0061* (2013.01); *B60W 10/30* (2013.01); *H02K 9/19* (2013.01); *B60L 2240/36* (2013.01); *B60L 2240/421* (2013.01)

(58) Field of Classification Search
CPC ..... B60K 1/00; B60K 2001/006; B60L 1/003; B60L 1/02; B60L 2240/36;
(Continued)

(56) References Cited

U.S. PATENT DOCUMENTS

| 2004/0069546 A1* | 4/2004 | Lou | F01P 7/167 180/65.265 |
| 2007/0169747 A1* | 7/2007 | Shimizu | F02B 39/005 123/434 |

(Continued)

FOREIGN PATENT DOCUMENTS

| JP | 2012-144245 A | 8/2012 |
| JP | 2013-199853 A | 10/2013 |
| JP | 2017-100700 A | 6/2017 |

*Primary Examiner* — Thomas Ingram
*Assistant Examiner* — Michael J Herrera
(74) *Attorney, Agent, or Firm* — Global IP Counselors, LLP

(57) ABSTRACT

An electric motor is cooled by using a first refrigerant. The first refrigerant is cooled by heat exchange with a second refrigerant having a cooling target that is different from the first refrigerant, and the first refrigerant after being cooled by the heat exchange is supplied to the electric motor. The supply flow rate of the first refrigerant to the electric motor is reduced where a temperature of the first refrigerant is less than a first prescribed temperature as compared to where the temperature of the first refrigerant is greater than or equal to the first prescribed temperature. The supply flow rate of the first refrigerant is continuously reduced as long as a temperature of the second refrigerant is below a second prescribed temperature even after the temperature of the first refrigerant reaches the first prescribed temperature.

13 Claims, 11 Drawing Sheets

(58) Field of Classification Search
CPC ......... B60L 2240/421; B60L 2240/425; B60L 3/0061; B60L 50/15; B60W 10/30; F01P 2003/006; F16H 57/0412; F16H 57/0476; H02K 9/19; Y02T 10/7072
See application file for complete search history.

(56) References Cited

U.S. PATENT DOCUMENTS

| | | | |
|---|---|---|---|
| 2009/0194044 A1* | 8/2009 | Nishida | F02B 37/10 |
| | | | 123/565 |
| 2012/0143414 A1* | 6/2012 | Shin | B60W 10/08 |
| | | | 903/904 |
| 2012/0261110 A1* | 10/2012 | Katoh | F28F 9/0246 |
| | | | 165/140 |
| 2013/0253744 A1* | 9/2013 | Nishimine | B60W 10/08 |
| | | | 180/65.265 |
| 2013/0283835 A1* | 10/2013 | Katoh | B60H 1/00328 |
| | | | 165/300 |
| 2016/0280215 A1* | 9/2016 | Nishimine | B60W 20/20 |
| 2017/0045133 A1* | 2/2017 | Akimoto | F16H 57/0413 |
| 2017/0175612 A1* | 6/2017 | Tokozakura | F01P 7/14 |
| 2017/0294865 A1 | 10/2017 | Kokuma et al. | |
| 2018/0023453 A1* | 1/2018 | Okamura | F01P 7/165 |
| | | | 123/142.5 E |

* cited by examiner

COOLING METHOD AND COOLING DEVICE OF ELECTRIC MOTOR

CROSS-REFERENCE TO RELATED APPLICATIONS

This application is a U.S. national stage application of International Application PCT/IB2018/000553, filed on Apr. 10, 2018.

BACKGROUND

Technical Field

The present invention relates to a cooling method and cooling device for an electric motor having a plurality of refrigerant systems.

Background Information

JP2017-100700A discloses a cooling device to be used in a hybrid vehicle. This device has a first circuit which includes, in the system, a motor/generator and an inverter for driving the vehicle, and a second circuit that includes, in the system, components requiring lubrication of the vehicle. An example of a component requiring lubrication is a gear in a power transmission mechanism that transmits outputs of an engine and a motor/generator to the drive wheels. The first circuit has a radiator and is configured such that the refrigerant after being cooled by the radiator is supplied to targets to be cooled, such as the motor/generator. On the other hand, the second circuit is configured as a branch circuit from the first circuit and is configured such that refrigerant before being cooled by the radiator is supplied to the components requiring lubrication. A flow rate control valve is provided at a branch portion of the second circuit from the first circuit, which controls the flow rate of the refrigerant that is distributed to the first circuit and the second circuit (paragraphs 0037 and 0045).

SUMMARY

According to the technique disclosed in the document described above, two dedicated circuits are required, one for cooling the motor/generator and one for lubricating the components requiring lubrication. In other words, in addition to a first circuit for cooling through which the refrigerant flows after being cooled by the radiator, it is necessary to provide a second circuit dedicated to lubrication through which the refrigerant flows after being cooled; and since a flow rate control valve is further provided at the branch portion of the second circuit from the first circuit, the number of components increases, so that cost and installation space restriction considerations become matters of concern.

On the other hand, under conditions in which the temperature of an electric motor is low, such as when the vehicle is cold-started, the viscosity of the refrigerant (such as oil) increases inside the electric motor, thereby increasing the friction generated in the electric motor. Thus, it is necessary to take appropriate measures such that the supply of refrigerant to the electric motor does not become excessive, which would prevent too great an extent the temperature of the electric motor from increasing and thus from being held.

In consideration of the problem described above, an object of the present invention is to provide an electric motor cooling method and cooling device.

One aspect of the present invention provides an electric motor cooling method for cooling an electric motor by using a first refrigerant. In the present aspect, the first refrigerant is cooled by using heat exchange with a second refrigerant having a cooling target that is different from the first refrigerant, and the first refrigerant after being cooled by heat exchange is supplied to the electric motor. Here, where the temperature of the first refrigerant is below a first prescribed temperature, the flow rate of the supply of the first refrigerant to the electric motor is reduced compared to where the temperature is greater than or equal to the first prescribed temperature, and the flow rate of the supply of the first refrigerant is continued to be reduced as long as the temperature of the second refrigerant is less than a second prescribed temperature even after the temperature of the first refrigerant reaches the first prescribed temperature.

Another aspect provides an electric motor cooling device.

BRIEF DESCRIPTION OF THE DRAWINGS

Referring now to the attached drawings which form a part of this original disclosure.

DETAILED DESCRIPTION OF EMBODIMENTS

Embodiments of the present invention will be described below, with reference to the drawings.

Explanation of Overall Structure

Figure 1:
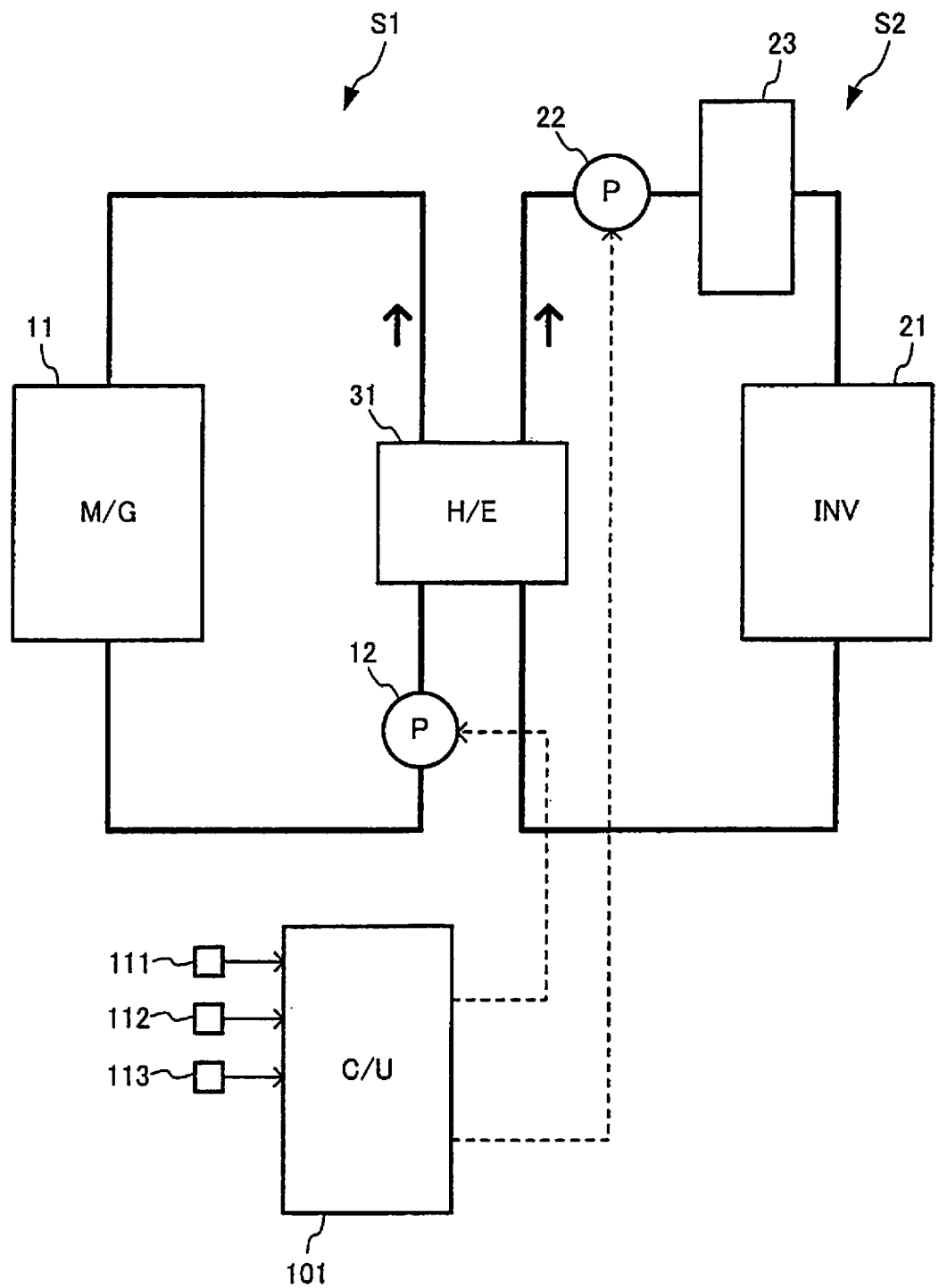
FIG. 1 is a schematic view illustrating an overall configuration of an electric motor cooling device according to one embodiment of the present invention.

FIG. 1 schematically illustrates an overall configuration of a cooling device for an electric motor 11 according to one embodiment of the present invention.

In the present embodiment, the electric motor 11 is a motor/generator having both a function as a generator and a function as an engine, and constitutes a drive source of an electric vehicle or a hybrid vehicle, for example. The vehicle can be moved forward or backward by transmitting the output of the electric motor 11 to the drive wheels of the vehicle. The electric motor 11 may be operated as either a generator or an engine.

A cooling device according to the present embodiment (hereinafter sometimes simply referred to as "cooling device") has a plurality of refrigerant systems, specifically, two refrigerant systems, a first refrigerant system S1 through which the first refrigerant circulates, and a second refrigerant system S2 through which a second refrigerant, the cooling target of which is different from that of the first refrigerant, circulates. While no limitation is imposed thereby, the first refrigerant is oil and the second refrigerant is cooling water. The first refrigerant and the second refrigerant are conceptually distinguished in order to specify the two systems S1, S2, and may be different types of refrigerants (for example, oil and cooling water), or the first refrigerant and the second refrigerant may be the same type of refrigerant, for example, two oil refrigerants.

The first refrigerant system S1 includes the electric motor 11 as the cooling target by using oil, which is the first refrigerant, and supplies the oil discharged by an oil pump 12 to the electric motor 11 in order to cool the electric motor 11 with the oil. The second refrigerant system S2 includes an inverter 21 as the cooling target by using cooling water, which is the second refrigerant, and supplies the cooling water discharged by a cooling water pump 22 to the inverter 21 in order to cool the inverter 21 with the cooling water. In the present embodiment, the inverter 21 is used for driving the electric motor 11. However, the cooling target by using the second refrigerant or the cooling water is not limited to a target having a relationship with the cooling target by using the first refrigerant, and may be a vehicle element unrelated to the electric motor 11.

A heat exchanger 31 is provided between the first refrigerant system S1 and the second refrigerant system S2 such that heat exchange is carried out between the oil flowing in the first refrigerant system S1 and the cooling water flowing in the second refrigerant system S2, and the oil whose temperature has risen as a result of cooling the electric motor 11 is cooled by using the cooling water in the heat exchanger 31. In the first refrigerant system S1, the heat exchanger 31 is on the upstream side of the electric motor 11, and the oil, after having undergone heat exchange with the cooling water, is supplied to the electric motor 11. On the other hand, in the second refrigerant system S2, the heat exchanger 31 is on the upstream side of the inverter 21, and the cooling water, after having undergone heat exchange with the oil, is supplied to the inverter 21. In the second refrigerant system S2, a radiator 23 is further provided between the heat exchanger 31 and the inverter 21, and the cooling water that has passed through the heat exchanger 31 is supplied to the inverter 21 via the radiator 23. The direction in which each refrigerant flows inside the heat exchanger 31 may be the same direction or opposite directions.

The operations of the oil pump 12 and the cooling water pump 22 in the cooling device are controlled by a controller 101.

In the present embodiment, the controller 101 is composed of a microcomputer, which acts as an electronic control unit and is equipped with a central processing unit (CPU), various storage devices such as ROM and RAM, an input/output interface, and the like.

The controller 101 takes in, as basic control data related to the cooling of the electric motor 11 (hereinafter referred to as "motor cooling control"), a signal from an oil temperature sensor 111 that detects the temperature of the oil (hereinafter referred to as "oil temperature"), which is the first refrigerant, a signal from a cooling water temperature sensor 112 that detects the temperature of the cooling water (hereinafter referred to as "cooling water temperature"), which is the second refrigerant, and a signal from a motor temperature sensor 113 that detects the temperature of the electric motor 11 (hereinafter referred to as "motor temperature").

The controller 101 executes preset calculations based on the various input signals in order to control the operation of the oil pump 12.

Here, the oil temperature Toil is an index of the temperature state of the first refrigerant (that is, the viscosity of the first refrigerant) in the first refrigerant system S1, and, in the present embodiment, the oil temperature at a cooling portion (for example, a stator holding an electromagnetic coil) of the electric motor 11 is detected, as the oil temperature Toil, by the oil temperature sensor 111. The cooling water temperature Twtr is an index of the ability of the second refrigerant to cool the first refrigerant, and, in the present embodiment, the temperature of the cooling water at the inlet portion of the heat exchanger 31 is detected, as the cooling water temperature Twtr, by the cooling water temperature sensor 112. The motor temperature Tmtr is an index of the temperature state of the electric motor 11, and, in the present embodiment, the temperature of a stator provided in the electric motor 11 is detected, as the motor temperature Tmtr, with the motor temperature sensor 113.

Content of Motor Cooling Control

Figure 2:
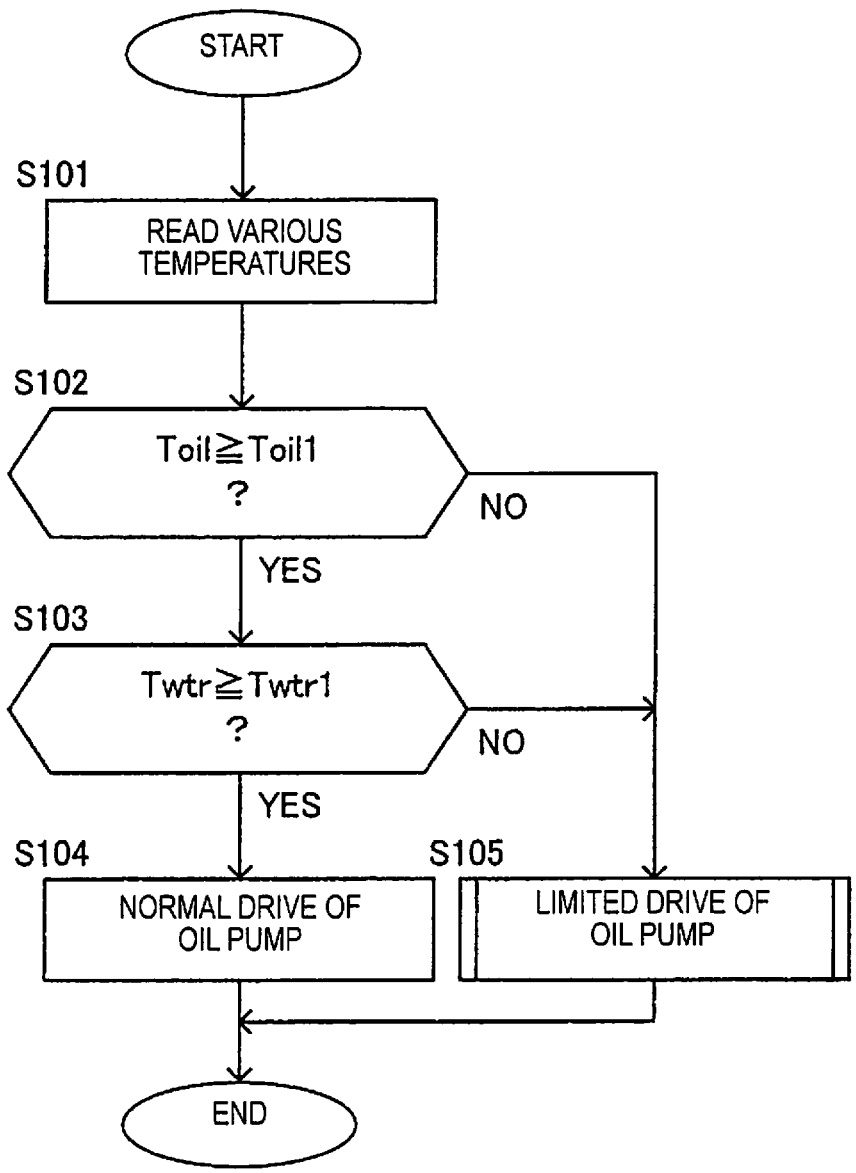
FIG. 2 is a flowchart illustrating the content of a basic routine of a motor cooling control executed by the cooling device according to the embodiment.

FIG. 2 illustrates, by using a flowchart, the content of a basic routine of the motor cooling control executed by the cooling device according to the present embodiment. The controller 101 is programmed to execute the control routine shown in FIG. 2 at prescribed time intervals.

In S101, various control data are read, such as the oil temperature Toil, the cooling water temperature Twtr, and the motor temperature Tmtr.

In S102, it is determined whether the oil temperature Toil is greater than or equal to an oil state determination temperature Toil1. The oil state determination temperature Toil1 corresponds to the "first prescribed temperature" set with respect to the first refrigerant, and, in the present embodiment, is set to a temperature indicating a state in which appropriate cooling of the electric motor 11 by using the oil is expected. If the oil temperature Toil is greater than or equal to the oil state determination temperature Toil1, then the process proceeds to S103, and if the oil temperature Toil is less than the oil state determination temperature Toil1, then the process proceeds to S105.

In S103, it is determined whether the cooling water temperature Twtr is greater than or equal to a cooling water state determination temperature Twtr1. The cooling water state determination temperature Twtr1 corresponds to the "second prescribed temperature" set with respect to the second refrigerant, and, in the present embodiment, is set to a temperature indicating a state in which the cooling water is no longer in an excessive low-temperature state, and excessive cooling of the oil by using the cooling water can be avoided. If the cooling water temperature Twtr is greater than or equal to the cooling water state determination temperature Twtr1, the process proceeds to S104, and if less than the cooling water state determination temperature Twtr1, the process proceeds to S105.

In S104, the oil pump 12 is driven in a normal operating mode.

In S105 the oil pump 12 is driven in a limited operating mode. In the limited operating mode, the flow rate of the oil supplied to the electric motor 11 is reduced, compared to the case of the normal operating mode. In the present embodiment, the oil pump 12 is intermittently driven to reduce the flow rate of the oil supplied to the electric motor 11. In contrast, in the normal operating mode, the oil pump 12 is continuously driven.

Figure 6:
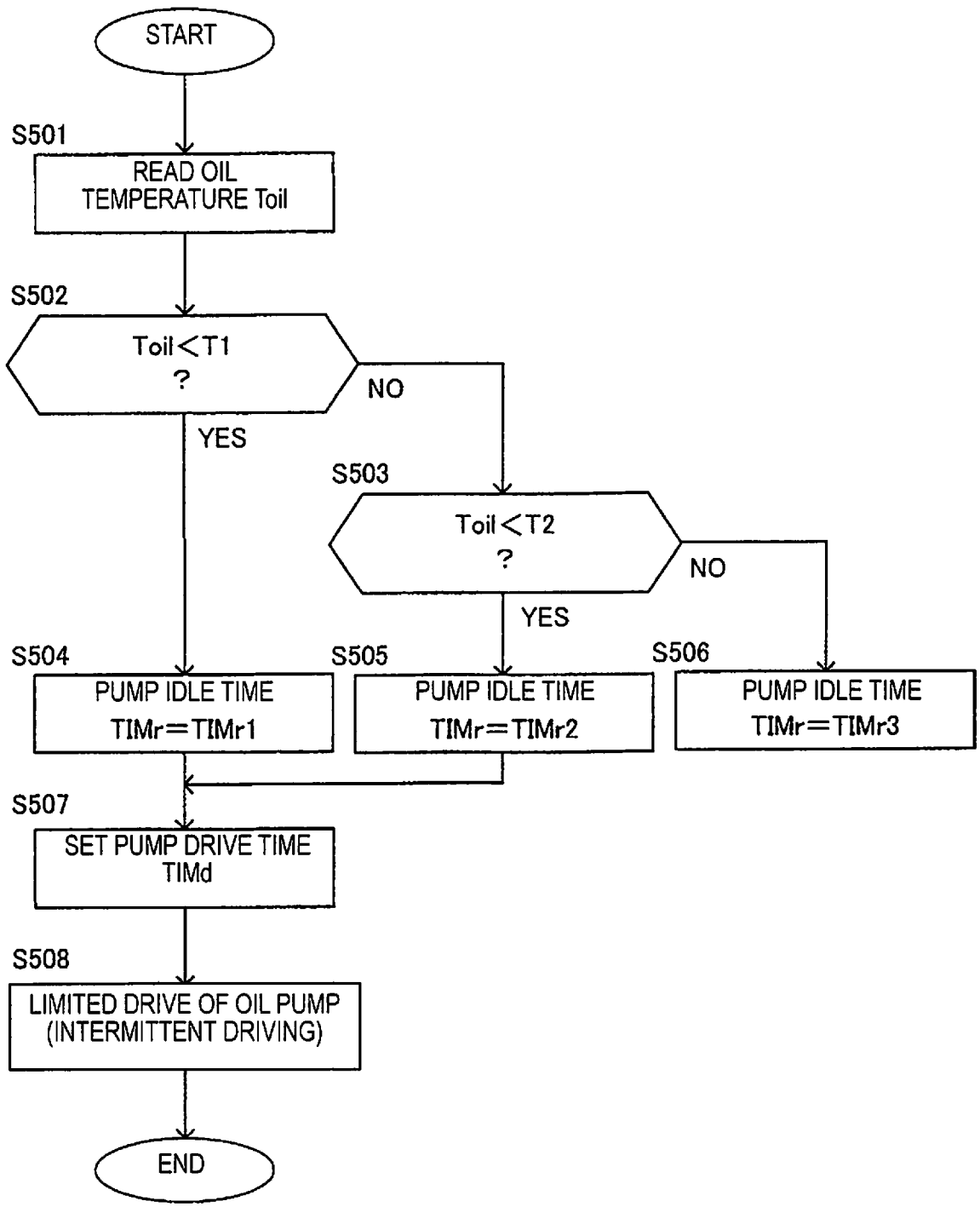
FIG. 6 is a flowchart illustrating the content of a pump limited drive process of the motor cooling control according to the embodiment.

FIG. 6 illustrates, by a flowchart, the content of a process (pump limited drive process) when the oil pump 12 is driven in the limited operating mode. In the present embodiment, the pump limited drive process is executed as a subroutine of the control routine shown in FIG. 2 (S105).

In S501, the oil temperature Toil is read.

In S502, it is determined whether the oil temperature Toil is below a first switching temperature T1. The first switching temperature T1 and second switching temperature T2 described below are set to temperatures below the oil state determination temperature Toil1 as threshold temperatures for switching an idle time TIMr in the intermittent driving of the oil pump 12. If the oil temperature Toil is below the first switching temperature T1, the process proceeds to S504, and if greater than or equal to the first switching temperature T1, the process proceeds to S503.

In S503, it is determined whether the oil temperature Toil is below the second switching temperature T2. The second switching temperature T2 is set to a temperature that is above the first switching temperature T1 and below the oil state determination temperature Toil1. If the oil temperature Toil is below the second switching temperature T2, that is, if the oil temperature Toil is greater than or equal to the first switching temperature T1 and less than the second switching temperature T2, the process proceeds to S505, and if greater than or equal to the second switching temperature T2, the process proceeds to S506.

Figure 7:
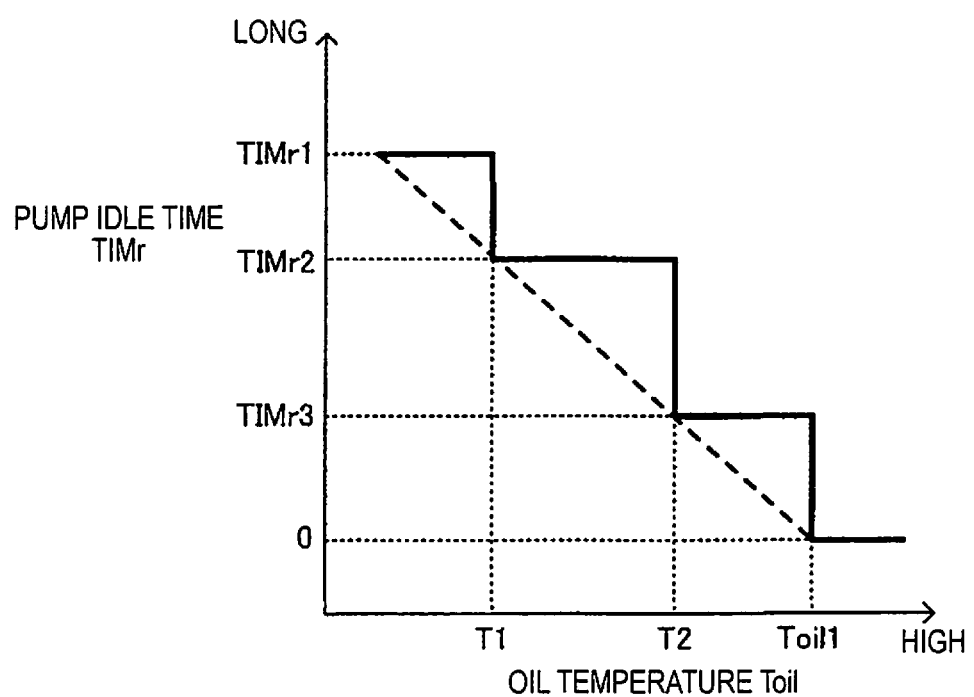
FIG. 7 is an explanatory view illustrating the setting trend of a pump idle time by using the pump limited drive process according to the embodiment.

In S504-506, an idle time (hereinafter referred to as "pump idle time") TIMr in the intermittent driving of the oil pump 12 is set. FIG. 7 illustrates the setting trend of the pump idle time TIMr with respect to the oil temperature Toil. The pump rest time TIMr is set to decrease as the oil temperature Toil increases, with respect to the oil temperature Toil that is below the oil state determination temperature Toil1, and, in the present embodiment, is decreased from the a pump idle time TIMr1 when below the first switching temperature T1 on the lowest temperature side to 0 in a stepwise manner. Not limited thereto, the pump idle time TIMr may be continuously decreased relative to the increase of the oil temperature Toil (FIG. 7 shows, by a dotted line, changes in the pump idle time TIMr when set to decrease continuously). In S504, the longest pump idle time TIMr1 is set, and in S506, the shortest pump idle time TIMr3 is set. In S505, an intermediate pump idle time TIMr2 is set.

In S507, a drive time TIMd with respect to the pump idle time TIMr (hereinafter referred to as "pump drive time") is set. The pump drive time TIMd may be constant, or may be obtained by subtracting the pump idle time TIMr from a total time TIMtt1, where the sum of the pump idle time TIMr and the pump drive time TIMd is held constant. In the latter case, the pump drive time TIMd is decreased as the oil temperature Toil decreases.

In S508, the oil pump 12 is driven in the limited operating mode. Specifically, after the oil pump 12 is operated for the pump drive time TIMd, it is paused for the pump idle time TIMr, and these operations and pauses are carried out repeatedly. In the present embodiment, the rotational speed of the oil pump 12 is held constant irrespective of the normal operating mode or the limited operating mode.

Explanation of Action and Effects

The cooling device for the electric motor 11 according to the present embodiment is configured as described above, and the effects obtained by the present embodiment will now be described.

First, a refrigerant system in which the first refrigerant circulates (first refrigerant system S1) and a refrigerant system in which the second refrigerant circulates (second refrigerant system S2) are provided, the first refrigerant is supplied to the electric motor 11, and the first refrigerant is cooled by heat exchange with the second refrigerant; by this configuration, separate circuits, each for the purpose of lubrication and cooling of the electric motor 11, become unnecessary, and a special configuration for controlling the distribution of the refrigerant to each circuit also becomes unnecessary. Thus, it becomes possible to decrease the parts count, reduce the cost, and ensure design flexibility in the arrangement.

Furthermore, when the temperature of the oil, which is the first refrigerant (oil temperature Toil) is below the oil state determination temperature Toil1 (corresponding to the "first prescribed temperature"), the supply of the oil to the electric motor 11 is restricted and the flow rate of the oil supplied to the electric motor 11 is reduced; as a result, it becomes possible to supply the oil necessary for lubrication to the electric motor 11 while avoiding cooling the electric motor 11 by using an excess supply of oil, under low-temperature conditions of the electric motor 11, such as during a cold-start of a vehicle.

Then, even after the oil temperature (oil temperature Toil) reaches the oil state determination temperature Toil1, as long as the temperature of the cooling water (cooling water temperature Twtr), which is the second refrigerant, is below the cooling water state determination temperature Twtr1 (corresponding to the "second prescribed temperature"), the restriction of the oil supply is continued and the flow rate of the oil supplied to the electric motor 11 is continuously reduced; as a result, it becomes possible to prevent an excessive amount of oil that has been cooled by the cooling water from being supplied to the electric motor 11 and excessively cooling the electric motor 11 by using the oil, thus avoiding excessive prevention of the rise of the temperature of the electric motor 11, or lowering of the temperature of the electric motor 11, which has risen once, as a result of cooling.

Here, when the flow rate of the oil supplied to the electric motor 11 is reduced, a reduction commensurate with the oil temperature Toil makes it possible to reliably prevent excessive cooling of the electric motor 11 by using the oil while ensuring the ability to lubricate the electric motor 11. This can be realized by a relatively simple method by intermittently driving the oil pump 12 when the oil supply flow rate is reduced.

Explanation of Modifications of Motor Cooling Control

Modifications of the motor cooling control executed by the cooling device according to the present embodiment will be described below with reference to the flowchart. In each of the modifications described below, the configuration of the hardware including the electric motor 11, the oil pump 12, the heat exchanger 31, and the controller 101 is the same as that of the previous example (FIG. 1), and the controller 101 is programmed to execute the motor cooling control of each modification at prescribed time intervals. In the following description, differences from the previous example (FIG. 2) will primarily be explained, and redundant explanations will be avoided.

First Modification

Figure 3:
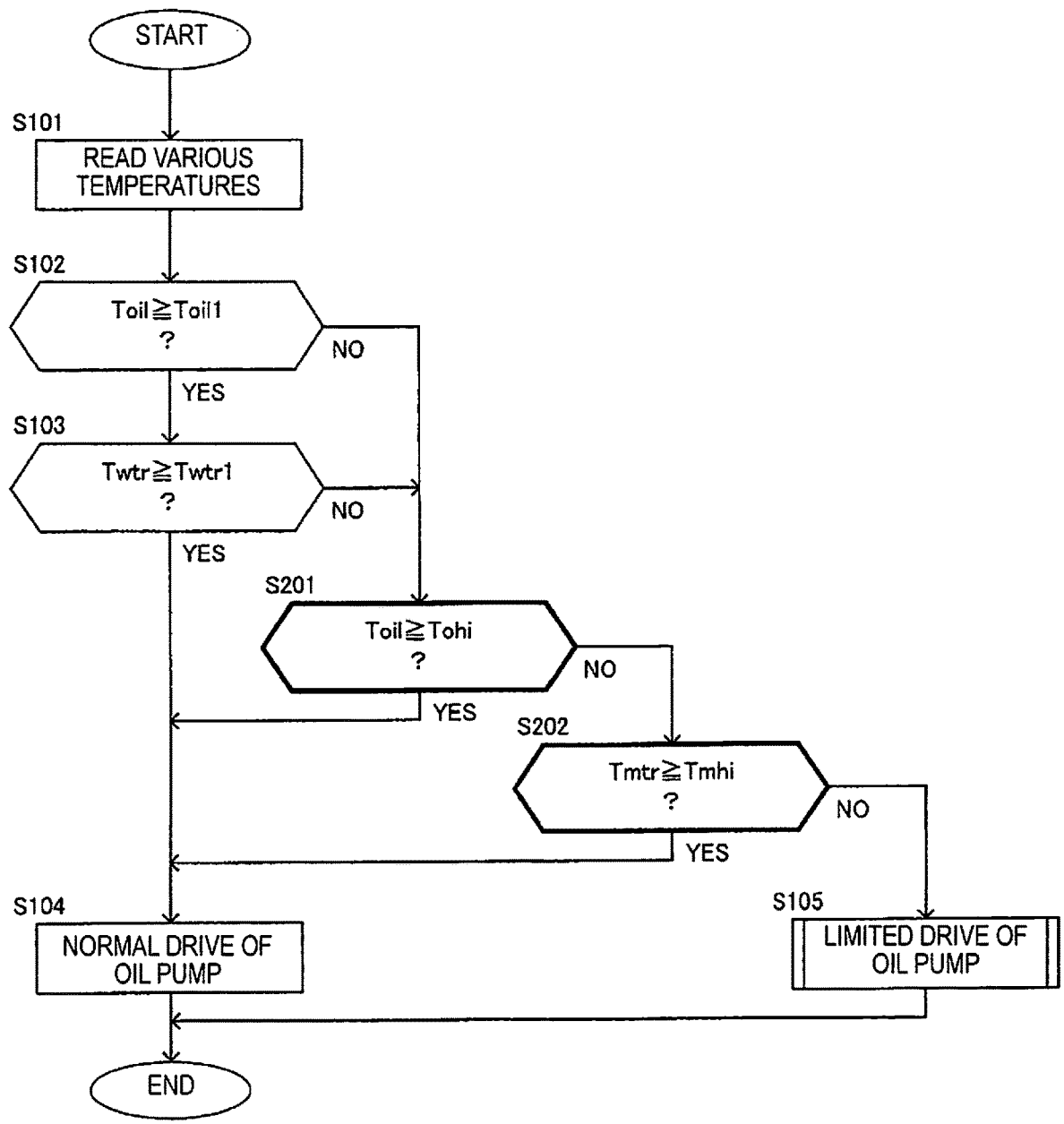
FIG. 3 is a flowchart illustrating the content of a basic routine of a motor cooling control according to a first modification of the embodiment.

FIG. 3 illustrates the content of the basic routine of the first modification.

In the first modification, S201 and 202 are added to the flowchart shown in FIG. 2. In the first modification, even under the condition that the supply of oil to the electric motor 11 should be restricted according to the determination of S102 and 103 (in other words, regardless of how low the temperature of the cooling water is), if the temperature of the oil or the electric motor 11 is excessively high, the cooling of the electric motor 11 is given priority and the restricted driving of the oil pump 12 is canceled.

Specifically, if the oil temperature Toil is below the oil state determination temperature Toil1 (S102), or, even if that is not the case, if the cooling water temperature Twtr has not reached the cooling water state determination temperature Twtr1 (S103), it is determined whether the oil temperature Toil is greater than or equal to an oil high-temperature determination temperature Tohi in S201. The oil high-temperature determination temperature Tohi corresponds to a "third prescribed temperature" set with respect to the first refrigerant, and, in the present embodiment, is set to a temperature that is above the oil state determination temperature Toil1, as the allowable upper limit of the temperature of the oil. If the oil temperature Toil is greater than or equal to the oil high-temperature determination temperature Tohi, the process proceeds to S104 in order to cancel the restricted driving of the oil pump 12, and if less than the oil high-temperature determination temperature Tohi, the process proceeds to S202.

In S202, it is determined whether the motor temperature Tmtr is greater than or equal to a motor high-temperature determination temperature Tmhi. The motor high-temperature determination temperature Tmhi corresponds to a "fourth prescribed temperature" set with respect to the electric motor 11, and, in the present embodiment, is set to the allowable upper limit of the temperature of the electric motor 11. The motor high-temperature determination temperature Tmhi and the oil high-temperature determination temperature Tohi may be equal to each other, or be different temperatures, in consideration of the position of the oil temperature sensor 111, etc., in the first refrigerant system S1. If the motor temperature Tmtr is greater than or equal to the motor high-temperature determination temperature Tmhi, the process proceeds to S104 in order to cancel the restricted driving of the oil pump 12, and if less than the motor high-temperature determination temperature Tmhi, the process proceeds to S105.

As already described above, in S104, the oil pump 12 is driven in the normal operating mode, and, in S105, the oil pump 12 is driven in the limited operating mode.

In this manner, when the temperature of the oil, which is the first refrigerant, rises to greater than or equal to the oil high-temperature determination temperature Tohi (corresponding to the "third prescribed temperature"), the restricted driving of the oil pump 12 is canceled and the oil pump 12 is driven in the normal operating mode, thereby making it possible to promote the cooling of the oil by using the cooling water, and securing the required cooling capability of the oil.

In addition, when the temperature of the electric motor 11 rises to greater than or equal to the motor high-temperature determination temperature Tmhi (corresponding to the "fourth prescribed temperature"), the restricted driving of the oil pump 12 is canceled and the oil pump 12 is driven in the normal operating mode, thereby making it possible to promote the cooling of the electric motor 11 by using the oil, and protecting the electric motor 11 from an excessive temperature increase.

Second Modification

Figure 4:
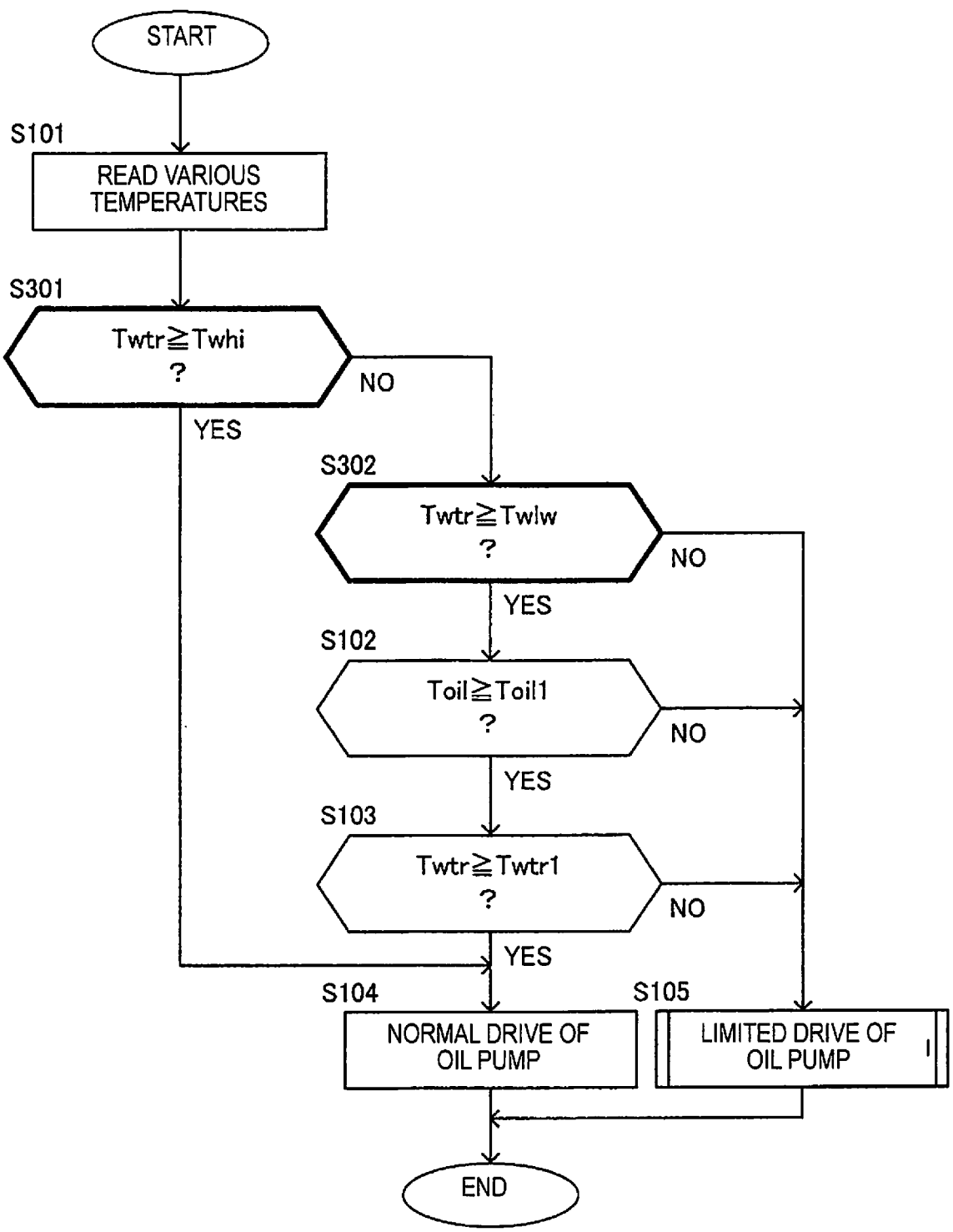
FIG. 4 is a flowchart illustrating the content of a basic routine of a motor cooling control according to a second modification of the embodiment.

FIG. 4 illustrates the content of the basic routine of the second modification.

In the second modification, S301 and 302 are added to the flowchart shown in FIG. 2. In the second modification, when the temperature of the cooling water is excessively low or excessively high, the operation of the oil pump 12 is restricted, or the restriction is canceled, regardless of the temperature of the oil.

Specifically, after reading various temperature data, such as the oil temperature Toil (S101), in S301, it is determined whether the cooling water temperature Twtr is greater than or equal to a cooling water high-temperature determination temperature Twhi. The cooling water high-temperature determination temperature Twhi corresponds to a "sixth prescribed temperature" set with respect to the second refrigerant, and, in the present embodiment, is set to a temperature that is above the cooling water state determination temperature Twtr1, as a temperature at which excessive cooling of the electric motor 11 when in the normal operating mode is expected to be avoided regardless of the temperature of the oil. If the cooling water temperature Twtr is greater than or equal to the cooling water high-temperature determination temperature Twhi, the process proceeds to S104 without carrying out the determination of S102 regarding the oil temperature, and, if less than the cooling water high-temperature determination temperature Twhi, the process proceeds to S302.

In S302, it is determined whether the cooling water temperature Twtr is greater than or equal to a cooling water low-temperature determination temperature Twlw. The cooling water low-temperature determination temperature Twlw corresponds to a "fifth prescribed temperature" set with respect to the second refrigerant, and, in the present embodiment, is set to a temperature that is less than the cooling water state determination temperature Twtr1, as a temperature indicating that the cooling of the electric motor 11 by using the oil would become excessive when the oil is cooled by using the cooling water, regardless of the oil temperature, due to the temperature of the cooling water being excessively low. If the cooling water temperature Twtr is greater than or equal to the cooling water low-temperature determination temperature Twlw, the process proceeds to S102, and if less than the cooling water low-temperature determination temperature Twlw, the process proceeds to S105.

As already described above, in S104, the oil pump 12 is driven in the normal operating mode, and, in S105, the oil pump 12 is driven in the limited operating mode.

In this manner, the flow rate of the oil supplied to the electric motor 11 is configured to be switchable depending on the temperature of the cooling water, the oil pump 12 is driven in the normal operating mode regardless of the oil temperature particularly when the temperature of the cooling water is sufficiently high (S301), and the oil pump 12 is forcibly driven in the limited operating mode when the temperature of the cooling water is excessively low (S302); as a result, it becomes possible to prevent the cooling of the electric motor 11 by using the oil from becoming excessive, while promoting an increase in the temperature of the electric motor 11.

Third Modification

Figure 5:
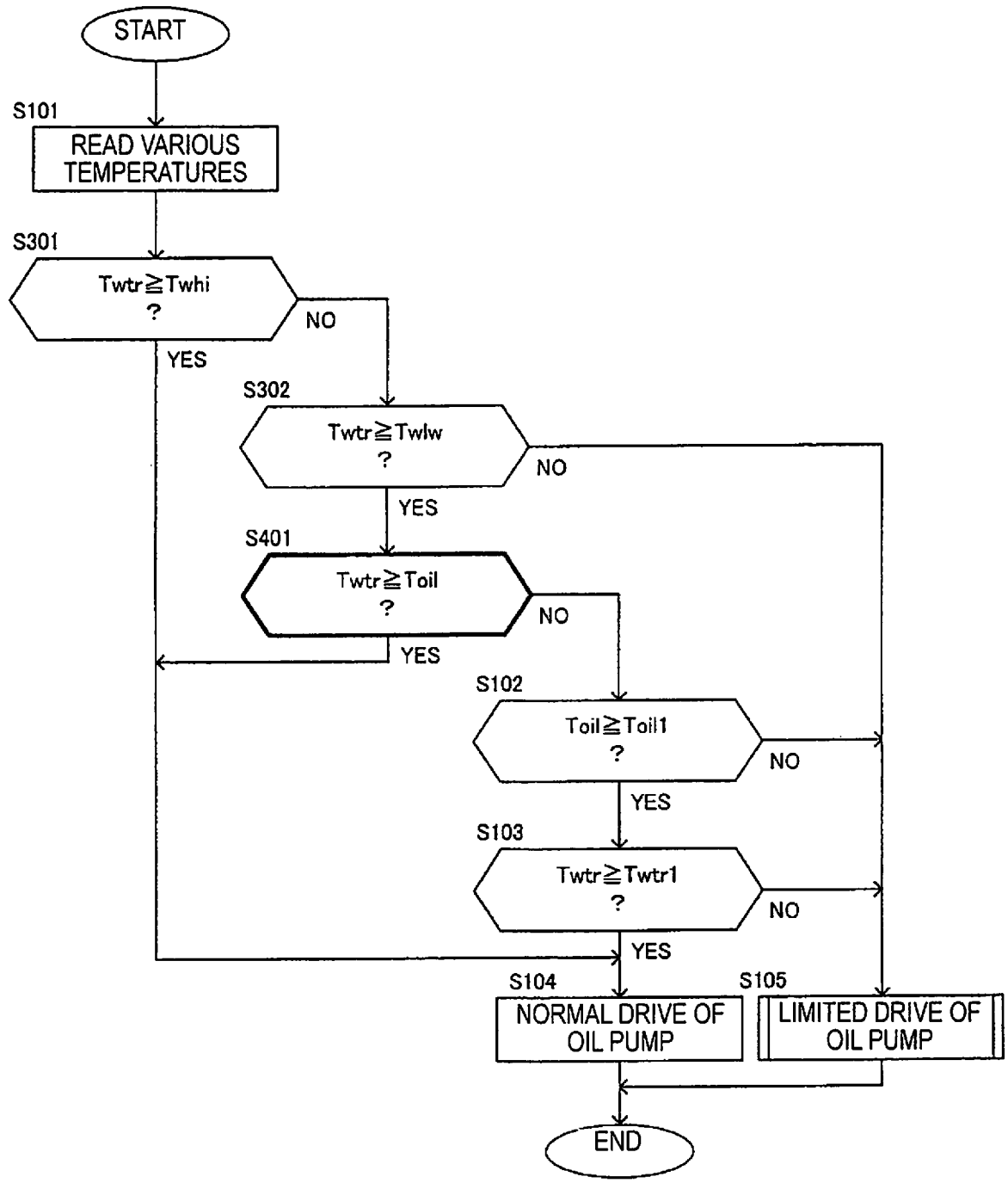
FIG. 5 is a flowchart illustrating the content of a basic routine of a motor cooling control according to a third modification of the embodiment.

FIG. 5 illustrates the content of the basic routine of the third modification.

In the third modification, S401 is further added to the flowchart shown in FIG. 4. In the third modification, restricted operation of the oil pump 12 is canceled depending on the relative relationship between oil temperature and cooling water temperature.

Specifically, when the cooling water temperature Twtr is below the cooling water high-temperature determination temperature Twhi (S301) and greater than or equal to the cooling water low-temperature determination temperature Twlw (S302), that is, when the cooling water temperature Twtr is between the cooling water low-temperature determination temperature Twlw and the cooling water high-temperature determination temperature Twhi, it is determined whether the cooling water temperature Twtr is greater than or equal to the oil temperature Toil in S401. If the cooling water temperature Twtr is greater than or equal to the oil temperature Toil, the process proceeds to S104 without carrying out the determination of S102 regarding the oil temperature, and the oil pump 12 is driven in the normal operating mode. On the other hand, if the temperature is less than the oil temperature Toil, the process proceeds to S102, and the oil pump 12 is driven in the normal operating mode (S104) or the limited operating mode (S105), in accordance with the oil temperature Toil and the cooling water temperature Twtr.

In this manner, when the cooling water temperature is greater than or equal to the oil temperature, particularly when it is higher than the oil temperature, the flow rate of the oil supplied to the electric motor 11 is increased, thereby making it possible to promote an increase in the temperature of the electric motor 11 while avoiding the restriction on the supply of oil being unnecessarily continued as a result of unnecessarily selecting the limited operating mode. An example of such a situation is a case in which the amount of heat generated by the cooling target by using the cooling water is large, and the cooling water temperature rises more quickly than the oil temperature.

Fourth Modification

Figure 8:
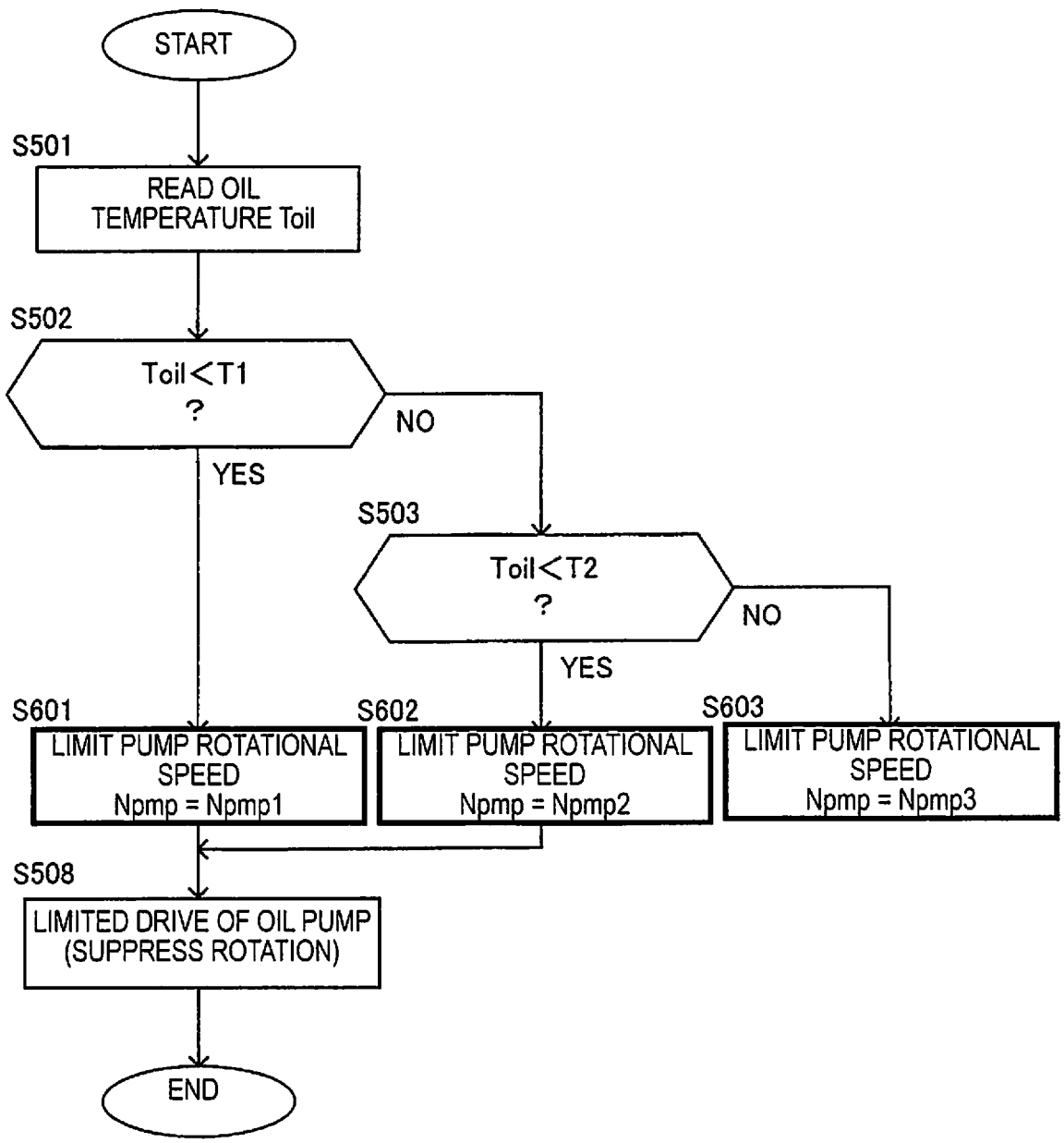
FIG. 8 is a flowchart illustrating the content of the pump limited drive process of the motor cooling control according to a fourth modification of the embodiment.

FIG. 8 illustrates the content of the pump limited drive process according to a fourth modification. The basic routine of the motor cooling control may be the same as the example shown in FIG. 2, or may be in accordance with any one of the first to the third modifications.

The fourth modification is different from the flowchart shown in FIG. 6 in that S504-506 are replaced with S601-603. In the example above (FIG. 6), the idle time (pump idle time TIMr) in the intermittent driving of the oil pump 12 is switched in accordance with the oil temperature Toil. In contrast, in the fourth modification, the rotational speed of the oil pump 12 is decreased more than in the normal operating mode.

Figure 9:
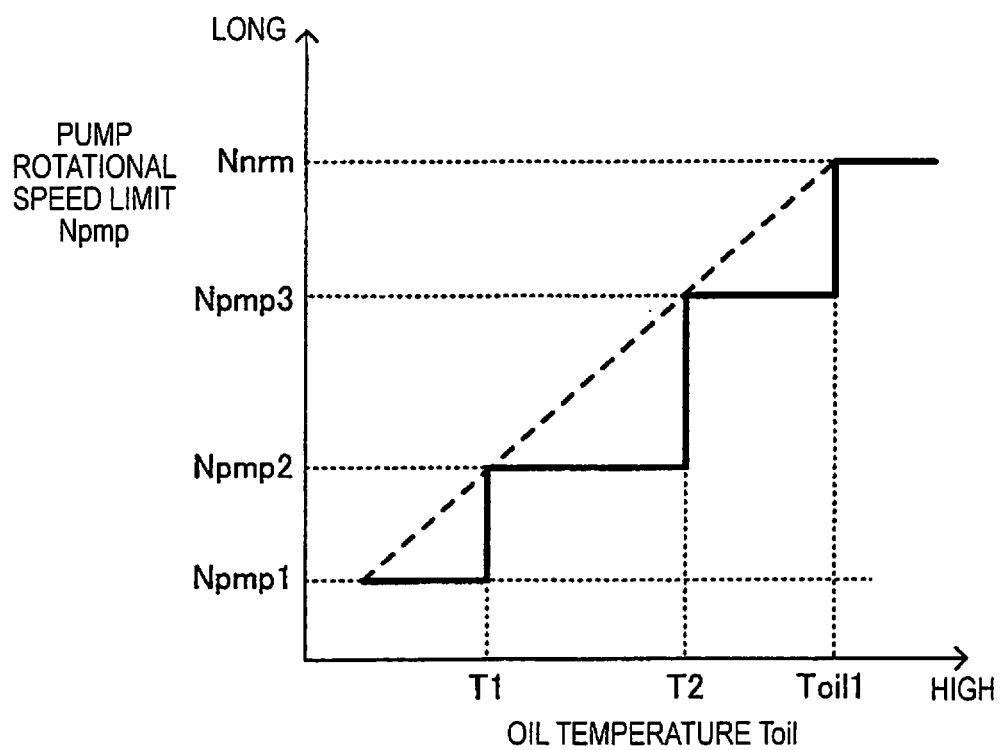
FIG. 9 is an explanatory view illustrating a tendency of setting the pump rotational speed limit by the pump limited drive process according to the embodiment.

Specifically, if the oil temperature Toil is below the oil state determination temperature Toil1, the rotational speed (hereinafter referred to as the "pump rotational speed limit") Npmp of the oil pump 12 is set in S601-603. FIG. 9 illustrates the setting trend of the pump rotational speed limit Npmp with respect to the oil temperature Toil. The pump rotational speed limit Npmp is set to increase as the oil temperature Toil increases, with respect to the oil temperature Toil that is below the oil state determination temperature Toil1, and, in the present embodiment, is increased in a stepwise manner from the pump rotational speed limit Npmp1 when it is below the first switching temperature T1 on the lowest temperature side to the rotational speed Nnrm in the normal operating mode. Not limited thereto, the pump rotational speed limit Npmp may be continuously increased relative to the increase in the oil temperature Toil (the dotted line in FIG. 9 indicates changes in the pump rotational speed limit Npmp when this speed is set to increase continuously). In S601, the lowest pump rotational speed limit Npmp1 is set, and in S603, the highest pump rotational speed limit Npmp3 (<Nnrm) is set. In S602, an intermediate pump rotational speed limit Npmp2 is set.

In S508, the oil pump 12 is driven in the limited operating mode. Specifically, the oil pump 12 is operated at the pump rotational speed limit Npmp, and the flow rate of the oil supplied to the electric motor 11 is decreased more than in the normal operating mode.

In this manner, the rotational speed of the oil pump 12 (the pump rotational speed limit Npmp) is reduced during driving in the limited operating mode, thereby making it possible to decrease the flow rate of the oil supplied to the electric motor 11 without the complicated control associated with intermittent driving.

Figure 10:
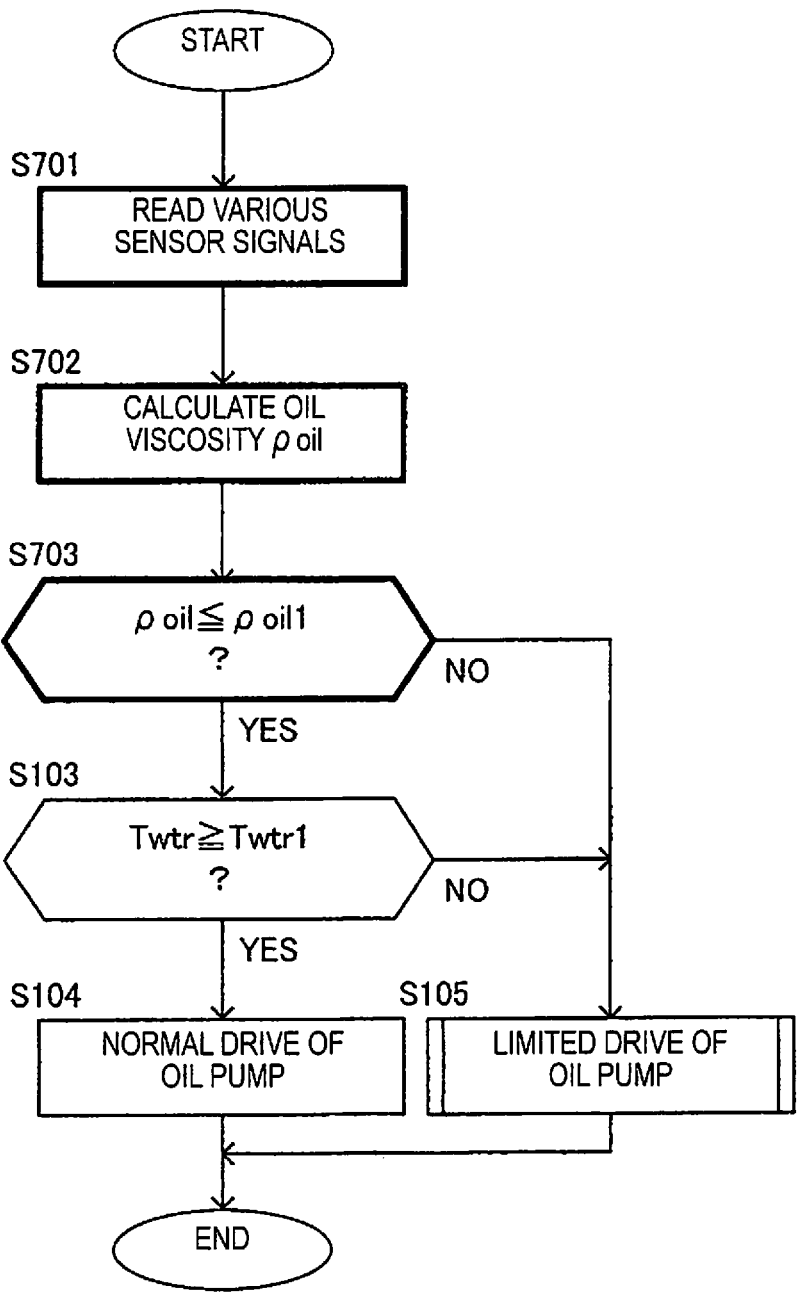
FIG. 10 is a flowchart illustrating the content of a basic routine of the motor cooling control according to a fifth modification of the embodiment.

FIG. 10 illustrates the content of the basic routine of the fifth modification.

The fifth modification is different from the flowchart shown in FIG. 2 in that S101-102 are replaced with S701-703. In the example above (FIG. 2), the temperature of the oil, which is the first refrigerant, is detected, and it is determined whether the oil temperature is greater than or equal to an oil state determination temperature Toil1 directly from the oil temperature. In contrast, in the fifth modification, the viscosity of the oil (hereinafter referred to as "oil viscosity") ρoil is estimated from the operating state of the oil pump 12, and the determination is made indirectly from the estimated oil viscosity ρoil.

Specifically, in S701, the cooling water temperature Twtr is read, and a discharge pressure Poil and a discharge flow velocity Voil of the oil pump 12 are read as the operating state of the oil pump 12. In S702, the oil viscosity ρoil is estimated using the following equation (1), based on the read pressure Poil and flow velocity Voil. In the following equation (1), k is a coefficient related to the estimation of the oil viscosity.

$$\rho oil = k \times Poil/(V^2) \qquad (1)$$

Then, in S703, it is determined whether the oil is at a temperature that is greater than or equal to the oil state determination temperature Toil1 based on the estimated oil viscosity ρoil; and if not, the operation of the oil pump 12 is restricted. Specifically, it is determined whether the oil viscosity ρoil is less than or equal to an oil state determination viscosity ρoil1; if the oil viscosity ρoil is less than or equal to the oil state determination viscosity ρoil1, the process proceeds to S103, and if it is higher than the oil state determination viscosity ρoil1, the process proceeds to S105. Here, the oil state determination viscosity ρoil1 corresponds to the viscosity of the oil at the oil state determination temperature Toil1. In S103-105, the same process as that of S103-105 shown in FIG. 2 is executed.

In this manner, the determination of whether the oil temperature is greater than or equal to the oil state determination temperature Toil1 is carried out based on the operating state of the oil pump 12; as a result, more options are available that relate to the specific processes carried out when the motor cooling control is executed, and it becomes unnecessary to install a special sensor for detection of the oil temperature.

In addition, when the oil state determination viscosity poil1 is set, it becomes easier to consider the effect that the oil viscosity has, not only on the cooling of the electric motor 11, but also on the operating efficiency of the oil pump 12. For example, if the upper limit of the oil viscosity poil, which is allowable from the standpoint of the operating efficiency of the oil pump 12, is below a threshold viscosity, which has been set from the standpoint of the cooling of the electric motor 11, the aforementioned upper limit viscosity is set as the oil state determination viscosity poil1. As a result, it becomes possible not only to avoid excessive cooling of the electric motor 11 by using the oil, but also to retain normal driving in a state in which the operating resistance with respect to the oil pump 12 is excessively high, so that motor cooling control can be more efficiently executed.

In addition to equation (1) above, the estimation of the oil viscosity poil can also be carried out by using the following equation (2). That is, the calculation executed in S702 shown in FIG. 10 can be replaced with the calculation shown in the following equation (2).

$$\rho\text{oil} = k1 \times P\text{pmp} / \{(Q\text{oil}/k2)^2\} \quad (2)$$

Here, Ppmp is the power consumption of the oil pump 12, Qoil is the discharge flow rate of the oil pump 12, and k1 and k2 are coefficients related to the estimation of the oil viscosity.

Additionally, the determination of whether or not the oil temperature is greater than or equal to the oil state determination temperature Toil1 can also be determined based on the temperature of the electric motor 11. Specifically, it is determined whether or not the motor temperature Tmtr is greater than or equal to a temperature Tmtr1 which indicates that the temperature of the oil is greater than or equal to the oil state determination temperature Toil1. The relationship between the temperatures Toil1 and Tmtr1 used as threshold values can be ascertained in advance by experimentation or other means. As a result, it becomes unnecessary to provide a special sensor for detecting the oil temperature, and the parts count can be further reduced.

DESCRIPTION OF OTHER EMBODIMENTS

Figure 11:
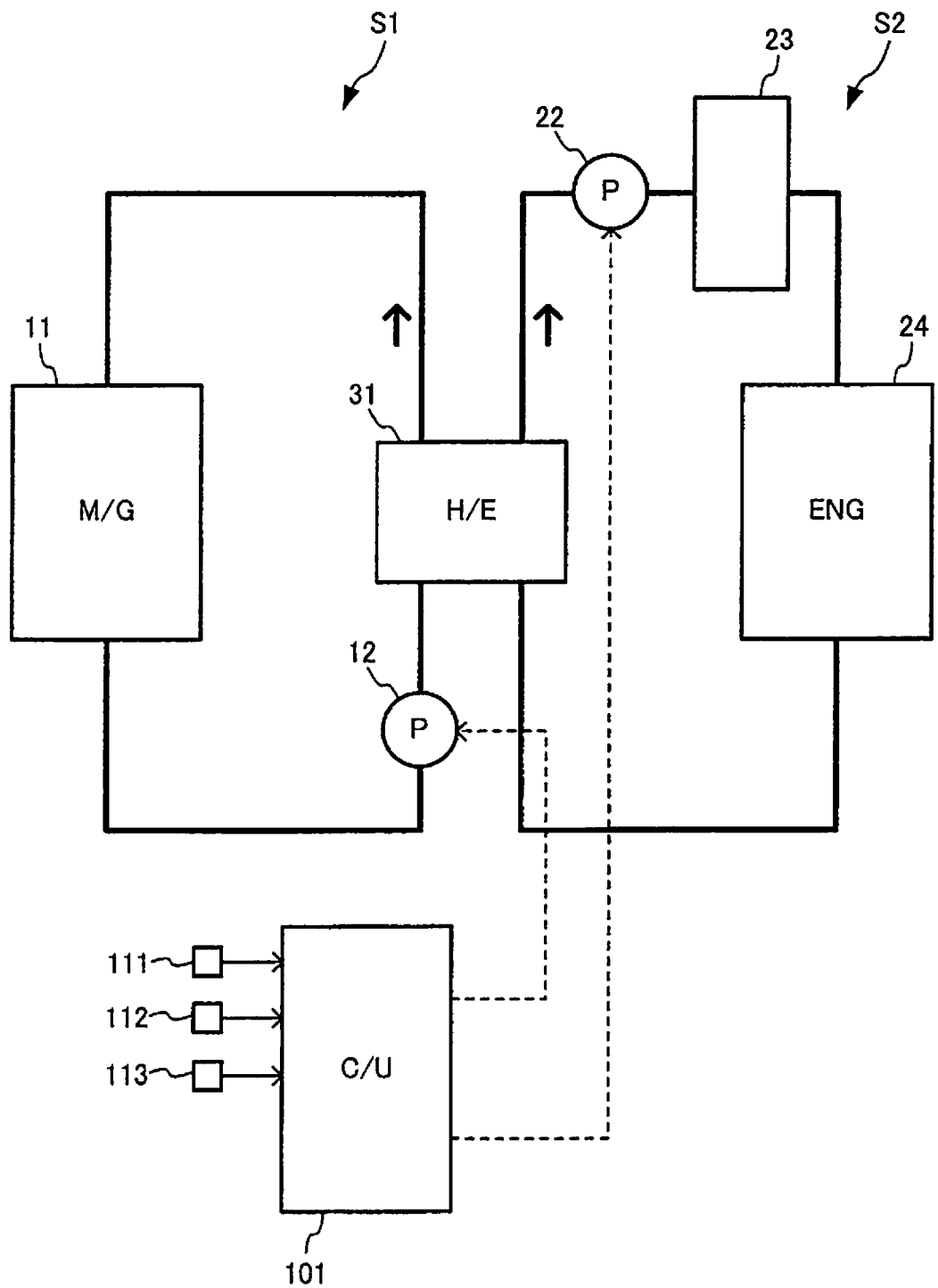
FIG. 11 is a schematic view illustrating an overall configuration of an electric motor cooling device according to another embodiment of the present invention.

FIG. 11 schematically illustrates the overall configuration of a cooling device for an electric motor 11 according to another embodiment of the present invention. The cooling device according to the present embodiment is different from the embodiment above (FIG. 1) in the cooling target by using the second refrigerant. In the present embodiment, the cooling device is applied to a hybrid vehicle that uses the electric motor 11 and an engine 24 as drive sources, and the electric motor 11 is cooled with the first refrigerant while the engine 24 is cooled with the second refrigerant. The first and second refrigerants can be different types of refrigerants, for example, such as oil as the first refrigerant and engine cooling water as the second refrigerant. In other respects, besides the foregoing, the present embodiment is the same as the previous embodiment, and it is possible to apply the various control routines and processes listed in relation to the previous embodiment.

Embodiments of the present invention were described above, but the above-described embodiments illustrate only some of the application examples of the present invention, and are not intended to limit the technical scope of the present invention to the specific configurations of the above-described embodiments. Various changes and modifications may be made to the embodiments described above within the scope recited in the claims section.

The invention claimed is:

1. An electric motor cooling method for cooling an electric motor by using a first refrigerant, the electric motor cooling method comprising:
   cooling the first refrigerant by heat exchange with a second refrigerant having a cooling target that is different from the first refrigerant;
   supplying the first refrigerant to the electric motor after being cooled by heat exchange;
   reducing a flow rate of the supply of the first refrigerant to the electric motor when a temperature of the first refrigerant is less than a first prescribed temperature as compared to when the temperature of the first refrigerant is greater than or equal to the first prescribed temperature, and
   continuously reducing the flow rate of the supply of the first refrigerant as long as a temperature of the second refrigerant is less than a second prescribed temperature even after the temperature of the first refrigerant reaches the first prescribed temperature.

2. The electric motor cooling method according to claim 1, further comprising
   detecting a temperature of the electric motor, and
   determining whether the temperature of the first refrigerant is greater than or equal to the first prescribed temperature based on the temperature that was detected.

3. The electric motor cooling method according to claim 1, wherein
   the supplying of the first refrigerant to the electric motor is supplied by a discharge from an oil pump,
   detecting an operating state of the oil pump, and
   determining whether the temperature of the first refrigerant is greater than or equal to the first prescribed temperature based on the operating state that was detected.

4. The electric motor cooling method according to claim 1, wherein
   the flow rate of the supply of the first refrigerant is increased more than the flow rate of the supply after the reduction where the temperature of the first refrigerant is greater than or equal to a third prescribed temperature, which is higher than the first prescribed temperature.

5. The electric motor cooling method according to claim 1, wherein
   the flow rate of the supply of the first refrigerant is increased more than the flow rate of the supply after the reduction where the temperature of the electric motor is greater than or equal to a fourth prescribed temperature.

6. The electric motor cooling method according to claim 1, wherein
   an amount of reduction is commensurate with a decrease in the temperature of the first refrigerant where the flow rate of the supply of the first refrigerant is reduced.

7. The electric motor cooling method according to claim 1, wherein
the flow rate of the supply of the first refrigerant is increased more than the flow rate of the supply after a reduction, regardless of the temperature of the first refrigerant where the temperature of the second refrigerant is greater than or equal to the temperature of the first refrigerant.

8. The electric motor cooling method according to claim 1, wherein
the flow rate of the supply of the first refrigerant to the electric motor is decreased more than the flow rate of the supply of the first refrigerant, regardless of the temperature of the first refrigerant where the temperature of the second refrigerant is less than a fifth prescribed temperature, which is below the second prescribed temperature.

9. The electric motor cooling method according to claim 1, wherein
the flow rate of the supply of the first refrigerant is increased more than the flow rate of the supply after a reduction, regardless of the temperature of the first refrigerant where the temperature of the second refrigerant is greater than or equal to a sixth prescribed temperature, which is higher than the second prescribed temperature.

10. The electric motor cooling method according to claim 1, wherein
the supplying of the first refrigerant to the electric motor is supplied by a discharge from an oil pump,
a rotational speed of the oil pump is decreased, or the oil pump is operated intermittently where the flow rate of the supply of the first refrigerant is reduced.

11. The electric motor cooling method according to claim 1, wherein
the second refrigerant is an engine cooling water, and
the cooling target of the second refrigerant includes an engine provided in a vehicle as a drive source.

12. The electric motor cooling method according to claim 1, wherein
a circulation path of the second refrigerant includes a radiator, and
the first refrigerant is cooled by using the second refrigerant after being cooled by heat exchange in the radiator.

13. An electric motor cooling device comprising:
a first refrigerant system includes an oil pump that supplies a first refrigerant discharged from the oil pump to an electric motor;
a second refrigerant system that circulates a second refrigerant to a cooling target that is different from the first refrigerant;
a heat exchanger interposed between the first refrigerant and the second refrigerant to cool the first refrigerant by heat exchange with the second refrigerant; and
a controller that controls an operation of the oil pump,
the controller being configured to
set an operating condition of the oil pump in each of a case where a temperature of the first refrigerant is less than a first prescribed temperature, and a case where the temperature of the first refrigerant is greater than or equal to the first prescribed temperature,
set the operating condition of the oil pump to reduce a supply flow rate of the first refrigerant to the electric motor where the temperature of the first refrigerant is less than the first prescribed temperature as compared to where the temperature of the first refrigerant is greater than or equal to the first prescribed temperature, and
set the operating condition of the oil pump to continuously reduce the supply flow rate of the first refrigerant as long as a temperature of the second refrigerant is below a second prescribed temperature even after the temperature of the first refrigerant reaches the first prescribed temperature.

* * * * *